United States Patent
Boudouris et al.

[15] 3,663,936
[45] May 16, 1972

[54] ADMISSION SYSTEM FOR DRIVE-IN ENTERPRISES

[72] Inventors: Angelo Boudouris, Sylvania; Stanley J. Kulish, Jr., Holland, both of Ohio

[73] Assignee: Eprad Incorporated, Toledo, Ohio

[22] Filed: Nov. 5, 1969

[21] Appl. No.: 874,360

[52] U.S. Cl. ............................................. 340/31 R, 340/51
[51] Int. Cl. ................................................. G08g 1/065
[58] Field of Search .................................. 340/31, 51

[56] References Cited

UNITED STATES PATENTS

| | | | |
|---|---|---|---|
| 3,018,470 | 1/1962 | Stancher | 340/51 |
| 3,090,941 | 5/1963 | Breese | 340/31 |
| 3,317,892 | 5/1967 | Schwarz | 340/31 |
| 2,989,736 | 6/1961 | Cooper | 340/31 |

*Primary Examiner*—William C. Cooper
*Attorney*—Owen & Owen

[57] ABSTRACT

An admission system is designed for use with drive-in enterprises wherein patrons enter the premises in automobiles. The admission system has a number of unique features including a cumulative counter for automatically totalling the number of patrons entering the premises at each predetermined admission rate. The system also includes a lock-out feature for preventing premature operation of the system as an automobile approaches the entrance. Further, the system has additional counters for totalling all automobiles entering the premises and all transactions completed.

12 Claims, 7 Drawing Figures

Patented May 16, 1972
3,663,936
3 Sheets-Sheet 1
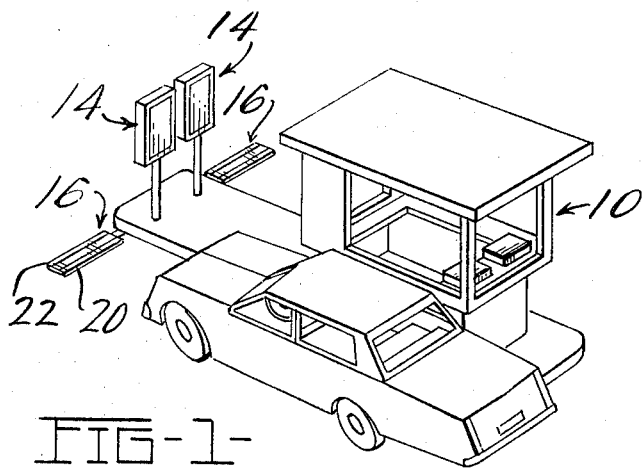
FIG-1-
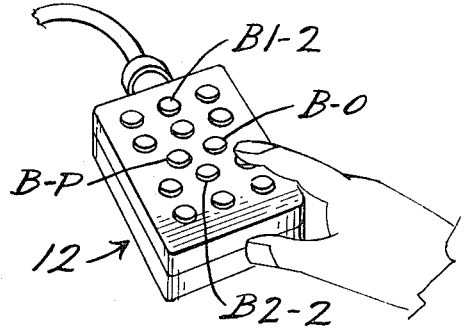
FIG-2-
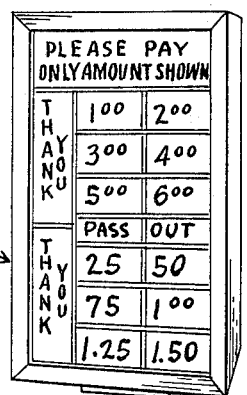
FIG-3-
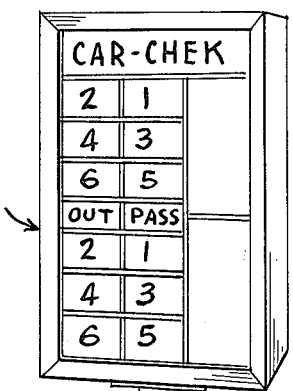
FIG-4-
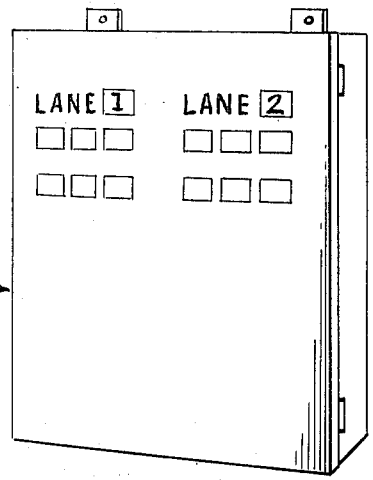
FIG-5-
INVENTORS:
ANGELO BOUDOURIS,
STANLEY J. KULISH, JR.
BY
ATT'YS.

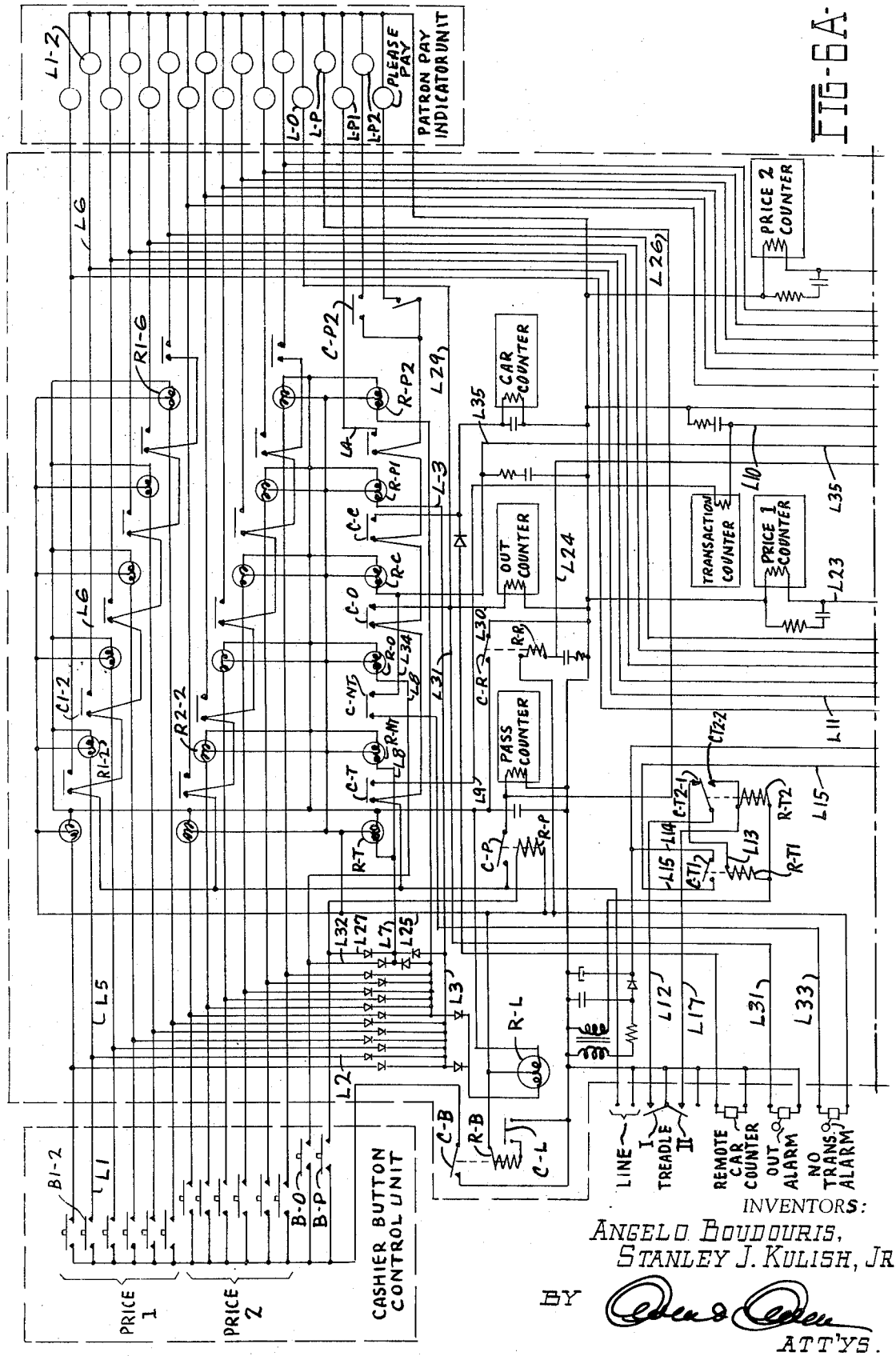

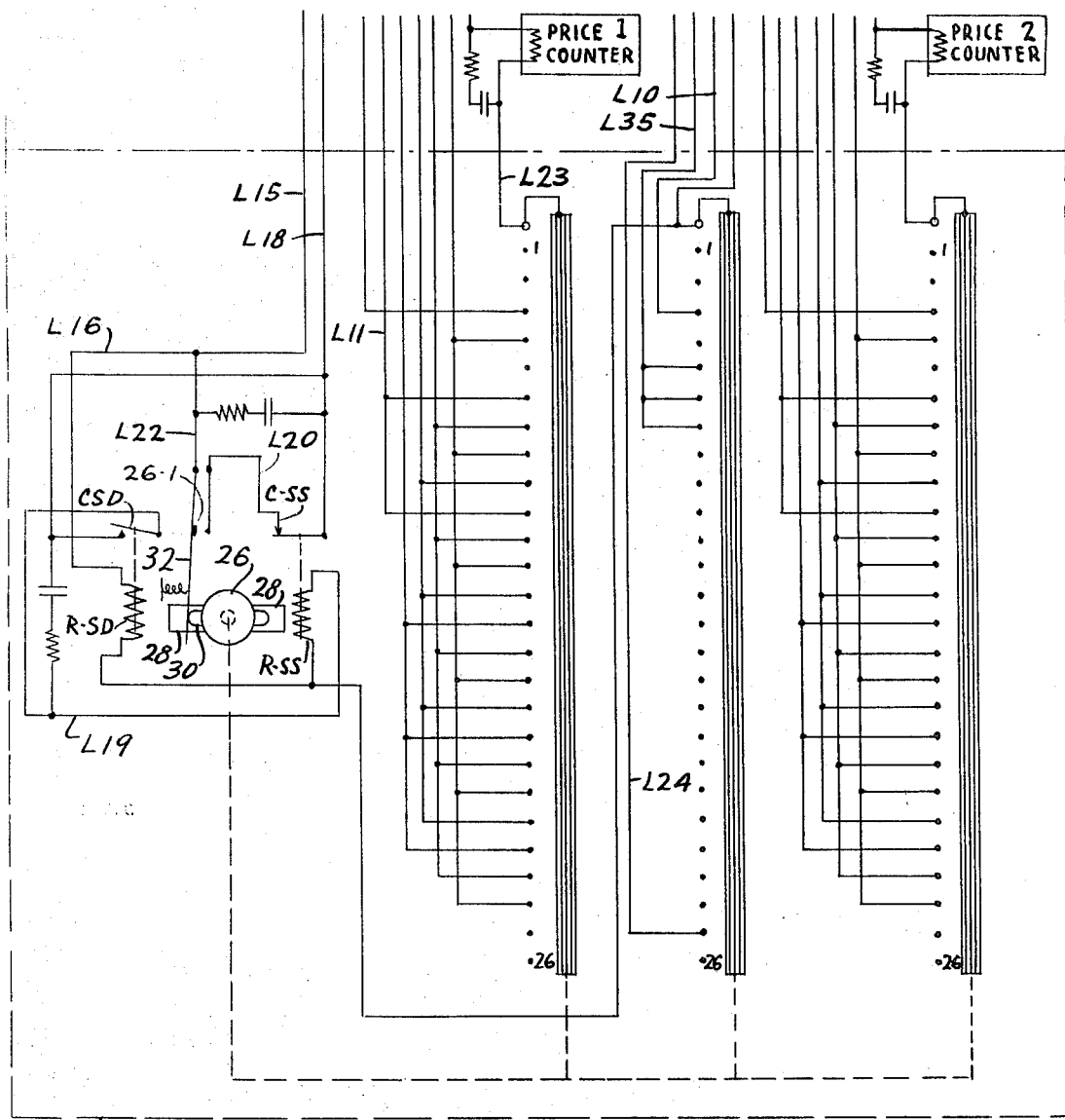
FIG-6B-

ADMISSION SYSTEM FOR DRIVE-IN ENTERPRISES

This invention relates to an admission system for use with drive-in theaters and the like, the patrons for which enter by automobile.

Basically, the admission system embodying the invention provides a means by which the box office operator can readily transmit to the patron in the automobile the amount of admission fee due. The number of patrons charged each predetermined admission rate is recorded by counters so that the manager of the enterprise can readily determine the amount of fees collected or which should have been collected over any given period of time. In the event the occupants of an automobile decide not to patronize the business and the automobile passes through the box office entrance, this transaction also can be duly noted. In the further event that an automobile passes through without any transaction recorded, this is also called to the attention of the manager. The new system also has a lock-out feature by means of which premature operation of the admission buttons by the operator is prevented.

It is, therefore, a principal object of the invention to provide an admission system having the advantages and features discussed above.

Other objects and advantages of the invention will be apparent from the following detailed description of a preferred embodiment thereof, reference being made to the accompanying drawings, in which:

FIG. 1 is an overall view in perspective of an admission entrance for a business enterprise, through which entrance automobiles pass;

FIG. 2 is a view in perspective of an operator controller;

FIG. 3 is a front view in perspective of a pay indicator unit;

FIG. 4 is a rear view in perspective of the unit of FIG. 3;

FIG. 5 is a view in perspective of a recorder unit on which counters are located; and FIGS. 6A and 6B are diagrammatic views of portions of a circuit of the admission system.

GENERAL OPERATION

Referring to FIG. 1, a box office for a drive-in theater or the like is indicated at 10 and is arranged so that entering automobiles can drive up to either side thereof. One or two operators or cashiers are in the box office to receive money from and issue tickets to the patrons in the automobiles. When an automobile is adjacent the box office, the operator presses an appropriate button on a controller 12 of FIG. 2 which lights an appropriate panel on the front of a pay indicator unit or sign 14 of FIG. 3 indicating the admission due. At the same time, a corresponding panel on the back of the unit 14 is lighted, as shown in FIG. 4, which indicates to the manager or other person in charge of the theater who is located at a remote point the amount which has been selected by the operator. As the automobile drives over a treadle assembly 16 (FIG. 1), the apparatus is re-set and appropriate counters are energized indicating the number of automobiles, transactions, and patrons involved. The counts are indicated on a recorder unit 18 of FIG. 5, preferably located in the box office 10, which has a separate group of counters for each side of the box office.

The controller 12 and the pay indicator unit 14 can be equipped for two admission rates. The first or upper portion of the unit can indicate the rate charged during the week nights while the second or lower portion can indicate the rate charged on the weekends. If there are different adult and children's rates, the adult rate can be indicated on the first portion and the children's rate on the lower or second portion, if desired. As shown in FIG. 3, the upper portion of the indicator is set for an admission rate of $1.00 per person while the lower scale is set for a rate of $0.25 per person. When a lamp is lit by the operator to indicate the amount due on a front panel, the corresponding panel on the back of the sign, as shown in FIG. 4, lights to indicate to the manager the number of people coming through at the particular rate to serve as a check on the operator, if desired.

OPERATOR BUTTONS

The operation of the overall system and particularly the circuit diagram of FIGS. 6A and 6B will now be discussed. When an automobile drives up to the box office, the operator pushes a button for the appropriate admission rate to indicate the number of occupants from which admissions are being received and to which tickets will be issued. If a ticket dispensing machine is employed, a single button can be used to dispense a desired number of tickets of a desired price and at the same time to operate the appropriate lamp in the pay indicator unit 14. In either case, the total admission due is lighted on the unit 14 so that patron immediately knows the amount to pay.

To illustrate, assuming the first admission rate of $1.00 per person is in effect and an automobile is driven in with two occupants, the operator will press a button designated B1–2 on the controller unit or ticket dispenser. When this button is pressed, a circuit is completed through lines L1, L2, and L3 (FIG. 6A) to a first price relay designated R–P1 which closes its associated contacts C–P1 and completes a circuit through a line L4 to a lamp designated L–P1. This lights the panel on the front of the indicator unit 14 which is designated, in this case, "THANK YOU" at the upper left hand side adjacent the first admission rate panel. At the same time, the button B1–2 completes a circuit through the line L1 and a line L5 to energize a relay R1–2 which, through its associated contacts C1–2 and line L6, lights a lamp L1–2 which lights a panel designated "$2.00" on the front of the indicator 14, conveying the total admission charge due to the patron.

At the same time, the back of the indicator unit is lighted and designates a colored upper right hand panel and the upper numeral "2" which can be seen by the manager or other party in charge.

RELAYS

The relays or contact-activating means of the circuit of FIG. 6, except where otherwise noted, are of a type which, when a first coil is momentarily energized, at least one pair of contacts are closed and remain closed until power is received by a second coil in the relay. Thus, when the relays R–P1 and R1–2 are energized and their contacts are closed by the pressing of the button B1–2, they remain closed even though the button is immediately released. Relays of this type can be obtained from General Electric Corporation under the designation RR3 or other relays of the latch-trip type which are commercially available can be used.

TRANSACTION COUNTER

When any of the 14 buttons are pushed, a "transaction" is recorded on a counter. To illustrate, when the button B1–2 is pushed, a "transaction" relay R–T is energized through the lines L1 and L2, and a line L7. At the same time that the relay R–T is energized, a "no transaction" relay R–NT is de-energized. The relay R–NT is the same type as the relay R–T but is wired oppositely so that when the relay R–T is energized, the relay R–NT will be opened by a pulse through a line L8. When the relays R–T and R–NT simultaneously receive power, corresponding contacts C–T close and C–NT open. When the contacts C–T close, a current path is completed through a line L9 to a "transaction counter." This counter, as well as the others, is a commercially available type which has a units dial advanced one digit each time the counter receives an electrical pulse. The power path through the transaction counter continues through a line L10 to a contact 3 (FIG. 6B) of a center bank of contacts of a stepper switch assembly which will be discussed subsequently. At this time, the counter has not yet advanced to record the transaction since the electrical path is not completed.

PRICE COUNTER

When the appropriate button indicating the number of patrons in an automobile is pressed and the appropriate lamps on the unit 14 are lighted, a price counter is set up along with the transaction counter. In this manner, when the count is recorded, the number of patrons entering the drive-in at each admission rate will be recorded on the appropriate price counter. Consequently, the manager can simply subtract the number on the "price – 1 counter," for example, at the beginning of the day from the number at the end of the day, or read the total number if the counter is re-settable, and immediately know without further computing, the number of patrons entering at the first admission rate. It is then a simple matter to multiply this number by the admission rate and determine the receipts for the day. There is no necessity for adding up figures from a plurality of counters to determine the proper total number of patrons and total amount of receipts based on different rates, as has heretofore been required. The two price counters are shown in both FIGS. 6A and 6B to provide continuity between the two figures.

To illustrate by the specific example, when the button B1–2 was pushed, indicating two patrons in the automobile, and the path was established to the lamp L1–2, a path was also established through a line L11 to two contacts designated 6 and 10 on the first bank (FIG. 6B) of contacts of the stepper switch assembly. When these contacts are connected sequentially with the "price – 1 counter," as will be discussed subsequently, each advances the units digit of the counter once so that the counter is advanced two units, recording that there were two patrons in the automobile.

TREADLE ASSEMBLY

When the transaction is complete, with the money received and the tickets dispensed, the automobile proceeds over the treadle assembly 16 which causes the transaction counter and the price counter to operate and also to extinguish the lights in the unit 14 and ready the system for another operation. The treadle assembly 16 actually consists of two pneumatic treadles or direct electrical contact or other appropriate signaling device 20 and 22 which are commercially available devices. The treadles are wired in the manner shown in FIG. 6A, however, so that an automobile tire moving forwardly over them will produce one reaction while a tire moving rearwardly over them will have no effect.

To illustrate the treadle operation, a treadle I is located closer to the box office and is represented by the hose 20, while a treadle II is located away from the box office and is represented by the hose 22. When the first treadle switch is closed, an electrical path is completed through a line L12, contacts C–T2–1 of a second treadle relay R–T2 and a line L13 to a coil of a first treadle relay R–T1, which is thereupon energized. Contacts C–T1 of the relay R–T1 then close, establishing a path through lines L14, L15, and L16 to a coil of a stepper driver relay designated R–SD. When the tire then engages the second hose 22, the second set of treadle contacts close thus establishing a path through a line L17 to the coil of the second treadle relay R–T2 which closes its normally open contacts C–T2–2 and opens its normally closed contacts C–T2–1 The circuit to the coil of the relay R–T1 is thereby broken and this relay is de-energized so that its normally open contacts C–T1 open and break the path to the stepper driver relay R–SD. When the treadles are engaged by a tire in the forward direction, they thus supply power through the relays R–T1 and R–T2 to the stepper driver relay R–SD which will operate the stepper assembly as will be discussed subsequently.

In the event an automobile backs up over the treadle assembly 16, the second treadle contacts first close, thereby energizing the coil of the relay R–T2 through the line L17, closing contacts C–T2–2 and opening contacts C–T2–1. When the tire then engages the first treadle, the relay R–T2 remains energized through the contacts C–T2–2 and the line L12. While this relay is energized and the contacts C–T2–1 are open, the relay R–T1 cannot be energized, with the result that the contacts C–T1 remain open. Thus, when an automobile backs up over the treadles, there is no effect on and no power is supplied to the stepper driver relay or any other of the components.

STEPPER SWITCH ASSEMBLY

The stepper switch assembly includes all of the components schematically located within the dotted line 24 in FIG. 6A. The assembly 24 is available commercially and can be obtained from C. P. Clare & Company, 3101 Pratt Boulevard, Chicago, Ill. The assembly is used to operate the counters when the automobile passes over the treadles and to re-set the system. As shown, the assembly includes three banks of 26 contacts each of which are actually arranged in three adjacent semicircular rows in the physical unit. A hub shown schematically at 26 has two diametrically opposite sets of wiper arms 28 one of which sequentially scans the 26 contacts of each bank each time the hub 26 rotates 180°. The hub automatically rotates through the 180° path when initiated and stops at the end of the path, until initiated once again.

For driving or rotating the hub 26 and the wiper arms 28, a stepper solenoid relay designated R–SS is employed in circuit with the stepper driver relay R–SD. When the driver relay R–SD is first actuated through the treadle relay R–T1, it closes it contacts C–SD to supply power from a line L18 through a line L19 to the coil of the stepper relay R–SS which is energized and opens its contacts C–SS. At this time, the contacts C–SS have no effect because they are in series with open contacts 26–1 held open by small cams 30 mounted on the hub 26 in general alignment with but axially spaced from the wiper arms 28. The relay R–SS remains energized at this time until the tire has moved past the treadle assembly and the relay contacts C–T1 again open to de-energize the relay R–SD, which de-energizes the relay R–SS.

Each time the relay R–SS is energized and then de-energized, it mechanically causes the hub 26 along with the wiper arms 28 and the cams 30 to rotate 1/26th of a 180° arc, thereby causing the wiper arms 28 to move incrementally from one contact to the next for each of the three banks of contacts. The cams 30 are of a size and shape in this instance to maintain the contacts 26–1 open until the hub 26 is moved two increments by the relay R–SS. When the hub is moved the second increment, the cam 30 moves beyond a spring-loaded contact arm 32 with the arm then swinging to the right, as shown, to close the contacts 26–1. When the rear tire of the automobile which has just been admitted to the premises passes over the treadle assembly, a second pulse is applied to the driver relay R–SD, thereby supplying power to the stepper relay R–SS a second time and causing the hub 26 to move the second increment in its 180° arcuate path. At the end of the second increment, the cam 30 has moved beyond the arm 32 and the contacts 26–1 close. This time, when the second or rear tire has moved beyond the treadle assembly and the relay R–SD is again de-energized, along with the relay R–SS, power will be supplied to the relay R–SD once more through the line L18, the contacts C–SS, a line L20, the contacts 26–1, and a line L22. The relay R–SD is then energized along with the relay R–SS. As soon as the relay R–SS is energized again, it opens the contacts C–SS, dropping out the relay R–SD which drops out the relay R–SS and energizes the relay R–SD again through the contacts C–SS which now close. This results in continuous pulsing of the relay R–SS and continuous incremental movement of the hub 26 until the second cam 30 engages the arm 32 and opens the contacts 26–1. By this time, the wiper arms 28 have moved through a 180° path and one of the wiper arms has sequentially engaged each of the contacts 1 to 26 of each of the three banks of contacts. The entire sequential movement of the stepper switch assembly takes place in less than a second or two after the second tire of the automobile has passed over the treadle assembly.

CAR COUNTER

Each time an automobile passes over the treadle assembly and a re-set relay R–R (FIG. 6A) is energized, the relay R–NT is energized to close its contacts C–NT. This supplies power to the car relay R–C which closes its contacts C–C. A path is then completed to a car counter which advances one numeral. Thus, each time an automobile passes the box office and the treadle assembly, the car counter advances. If desired, a remote car counter can be employed in the manager's office or at the snack bar, for example, to provide an indication of the number of people entering the theater so that advance plans can be made accordingly. One remote counter can be employed to be responsive to automobiles passing over both treadle assemblies to provide a single total count, if desired.

PRICE COUNTERS

During the movement of the hub 26, the wiper arm 28 for the center bank of contacts has completed a circuit through the contact 3 momentarily to close the circuit through the line L10 and cause the transaction counter to advance one unit. At the same time, the wiper arm 28 for the fist bank of contacts has temporarily sequentially engaged the contacts 6 and 10 so as to complete a path through the line L11 twice in the 180° movement to pulse the "price–1 counter" twice through a line L23 to advance its units dial twice and increase its count by two during the 180° movement.

If, by way of further example, there had been six patrons in the automobile, and the corresponding B1–6 had been pressed, then through relay R1–6 an electrical path would have been established to contacts 4, 8, 12, 16, 20, and 24 of the first bank of contacts whereby the "price –1 counter" units dial would have been pulsed and advanced six times during the 180° movement. However, the transaction counter would still have advanced only one unit or number.

RE-SET RELAY

As the wiper arms 28 complete their incremental 180° sweep, a circuit is completed through contact 25 of the middle bank to supply power through a line L24 and energize the re-set relay R–R. This closes its contacts C–R to connect to ground the second coils of all of the relays designated R1–1 to R1–6, R2–1 to R2–6, R–T, R–NT, R–P1, R–P2, R–C, and an additional relay designated R–O, to be discussed. The contacts of all of these relays then open except for the contacts C–NT of the relay R–NT which close. The box office is then ready to admit another automobile.

"PASS" OPERATION

From time to time, patrons are admitted with passes, either free or at a reduced rate. When this occurs, the operator presses a pass button designated P–P once for each patron of an automobile having a pass. This completes a path through a line L25 each time the button contacts are closed to energize a pass control relay designated R–P. This relay then closes contacts C–P to complete a circuit through a pass counter which advances one unit each time and also completes a path through a line L26 to a lamp L–P lighting a "pass" panel on the unit 14. The operator also presses the usual price buttons if an admission is paid for any of the patrons and the price and other counters operate in the usual manner. The transaction relay R–T is also energized by the pass button B–P through a line L27 and the line L7 so that the transaction counter will advance once in the usual manner.

OUT OPERATION

In the event an automobile drives to the entrance and the occupants decide not to see the movie, there is usually a line behind them so that they cannot back out. This means they must travel over the treadle assembly, turn around, and exit elsewhere. When this occurs, the operator or cashier presses an "out" button designated B–O. A circuit is then completed through a line L28 to an out relay R–O which closes its contacts C–O. This lights an out lamp designated L–O on the indicator 14 through a line L29 and closes a circuit to an out counter through a line L30 which advances one number when the power is removed. The closed contacts C–O also complete a circuit through a line L31 to an out alarm which rings to call the situation to the attention of the manager.

When the "out" button is pressed, the transaction relay is energized through a line L32 so that the transaction is recorded on the transaction counter as before. When the system is re-set in the usual manner, the "out" counter advances. The "out" alarm bell also continues to ring until the automobile passes over the treadle assembly.

NO TRANSACTION OPERATION

If an automobile should pass the box office and enter the premises without any transaction being recorded, an alarm designated "no transaction" alarm (FIG. 6A) is connected through a line L33, the closed contacts C–NT of the "no transaction" alarm relay, and lines L34 and L35 to any suitable number of the contacts (FIG. 6B) of the second bank of contacts of the stepper switch assembly 24. When the automobile passes over the treadle assembly with none of the fourteen buttons being pushed and with the "no transaction" alarm contacts C–NT still closed, as the stepper switch assembly indexes and engages the contacts wired to the line L35, the "no transaction" alarm will ring, notifying the manager of this situation. The car counter will advance as usual but the transaction counter will not. Thus, the difference in net count between the transaction counter and the car counter at the end of a day will indicate the number of "no transaction" situations occurring. Further, the net count on the transaction counter should equal the sum of the net counts on the "price 1," "price 2," and "out" counters with any difference being the number of automobiles in which all occupants enter on free passes.

The third bank of contacts of the stepper switch assembly 24 is the same as the first bank but directed to the "price 2" transactions and will not be discussed in detail. If the second admission rate applies to then the both "price 1" and "price 2" counters can be operated at the same time. In his instance, the net count on these counters can exceed the count on the "transaction" and the "car" counters.

LOCK-OUT RELAY

At times, there is a tendency for a box office operator to anticipate the next car load of patrons and push the button corresponding to the number and admission rate prior to the previous automobile passing over the treadle assembly. This can result in a second lamp being lighted on the indicator unit 14 and also produce an incorrect count on some of the counters. To prevent this, a lock-out relay designated R–L can be incorporated into the circuitry and be energized when any of the 14 buttons is pushed. When the first coil of this relay is energized, it opens normally closed contacts C–L which de-energizes a main button relay R–B which opens contacts C–B and isolates power from all of the 14 buttons, preventing a second operation of any of the buttons. When the re-set relay R–R is energized to close the contacts C–R, the second coil of the lock-out relay R–L is energized and the contacts C–L again close, readying the circuit for the next transaction after the previous automobile has passed over the treadle assembly.

In the event the buttons are used in conjunction with a ticket-dispensing machine, the relay R–L can be used to actuate a rod which mechanically prevents subsequent pushing of the buttons after the first one is pushed. Again, if the buttons are used with a ticket machine of the type having a motor which must be on in order to effect a transaction, the contacts C–L or C–B can be used to control operation of the motor, causing it to shut off after a button is initially pushed and remain off until the automobile passes over the treadle assembly.

The stepper switch assembly need not operate incrementally but the wipers can be operated in a smooth and more rapid manner, if desired. However, the slow incremental action achieved through the two relays R–SS and R–SD enables the counters employed to be of a lower cost and reliable A.C. type than the faster-operating D.C. type which would be needed with a faster-operating switch assembly.

It will be seen from the above discussion that the apparatus embodying the invention has a number of advantages over the system heretofore known. The counter arrangement, in particular, facilitates keeping track of the receipts and associated transactions while the alarm arrangement provides an additional check for the management. The lock-out arrangement preventing subsequent operation of the buttons is also an important feature to prevent inaccuracies.

Various modifications of the above described embodiment of the invention will be apparent to those skilled in the art and it is to be understood that such modifications can be made without departing from the scope of the invention, the embodiment shown and described being primarily for purposes of illustration and not limitation.

We claim:

1. An admission control system for use with an entrance through which automobiles normally pass and where a predetermined fare is collected comprising, in combination, a plurality of switches corresponding to the plurality of fares that patrons in each entering automobile may be charged based upon the number of patrons in the automobile, said plurality of switches being positioned adjacent said entrance, an indicator unit including a plurality of indicating lamps with a different one of said lamps corresponding to each of said plurality of switches, said indicator unit having a panel positioned in full view of patrons in the entering automobile, a treadle switch assembly positioned adjacent the entrance on the side through which the automobiles pass after the fare is collected, a plurality of electrical contacts, at least one pair of said contacts being associated with each of said switches, a plurality of means associated with each of said plurality of switches for closing each of said at least one pair of contacts when the associated switch is actuated, means connecting said contacts with said lamps to selectively light each lamp when a corresponding switch is closed, counting means for counting the total number of patrons entering at the predetermined fare, and means associated with said contacts for operating said counting means when an automobile passes over said treadle switch assembly.

2. A system according to claim 1 and including an additional counter for counting all transactions occurring at the entrance.

3. A system according to claim 1 and including a car counter for counting all automobiles passing through the entrance and over said treadle switch assembly.

4. A system according to claim 1 and including an alarm, and means for actuating said alarm when an automobile passes through the entrance and over said treadle switch assembly without any of said plurality of switches being closed.

5. An admission control system according to claim 1 wherein said means associated with said contacts for operating said counting means includes a plurality of additional contacts located in a predetermined pattern, contact means movable in a path for sequentially connecting each of said additional contacts to said counting means, means responsive to the actuation of each of said plurality of switches for completing a circuit to a predetermined number of said additional contacts corresponding to the number of patrons corresponding to each such switch, and means responsive to an automobile passing over said treadle switch assembly for causing said contact means to sequentially contact each of said additional contacts, whereby said counter means is counted up by one each time said contact means is connected to a contact to which a circuit is completed.

6. An admission control system for use with an entrance through which automobiles normally pass and where a predetermined fare is collected comprising, in combination, a plurality of switches corresponding to the plurality of total fares that patrons in each entering automobile may be charged, said plurality of switches being positioned adjacent said entrance, an indicator unit including a plurality of indicating lamps with a different one of said lamps corresponding to each of said plurality of switches, means for lighting each lamp when the corresponding switch is closed, said indicator unit having a panel thereof positioned in full view of patrons in automobiles passing through the entrance, a treadle switch assembly positioned adjacent the entrance on the side through which the automobiles pass after the fare is collected, counting means for indicating the number of patrons entering at the entrance, said counting means being activated when an automobile passes over said treadle switch assembly, and means for making the operation of remaining ones of said plurality of switches ineffective after one of said plurality is closed and before an automobile passes over said treadle switch assembly.

7. An admission control system according to claim 6 wherein said counting means indicates the total number of patrons entering at the entrance at each of a plurality of different fares.

8. An admission control system according to claim 6 and including means for inhibiting activation of said counting means if an automobile backs up over said treadle switch assembly.

9. An admission control system according to claim 6 wherein said counting means is activated only when two wheels on one side of an automobile pass over said treadle switch assembly.

10. An admission control system according to claim 6 and including a remote counter spaced from the entrance, said remote counter indicating the total number of automobiles passing through the entrance.

11. An admission control system for use with an entrance through which automobiles normally pass and where a predetermined fare is collected comprising, in combination, a plurality of switches corresponding to the plurality of total fares that patrons in each entering automobile may be charged, an out switch for indicating an automobile from which no fare is received, said plurality of switches being positioned adjacent said entrance, an indicator unit including a plurality of indicating lamps with a different one of said lamps corresponding to each of said plurality of switches, means for lighting each lamp when the corresponding switch is closed, said indicator unit having a panel thereof positioned in full view of patrons in automobiles passing through the entrance, an alarm, means for operating said alarm when said out switch is closed, switch means positioned adjacent the entrance for detecting an automobile passing through the entrance, a second alarm, means for operating said second alarm if an automobile activates said switch means when none of said switches including said out switch is closed, counting means associated with said plurality of switches for indicating the total number of patrons entering the entrance, and means for operating said counting means when an automobile activates said switch means after one of said plurality of switches has been actuated.

12. A system according to claim 11 and including means for making the operation of more than one of said plurality of switches and said out switch ineffective until an automobile concerning which a first of said switches was actuated has activated said switch means.

* * * * *